V. W. STRAUB.
WHEEL DETACHER.
APPLICATION FILED APR. 29, 1910.
984,978.
Patented Feb. 21, 1911.
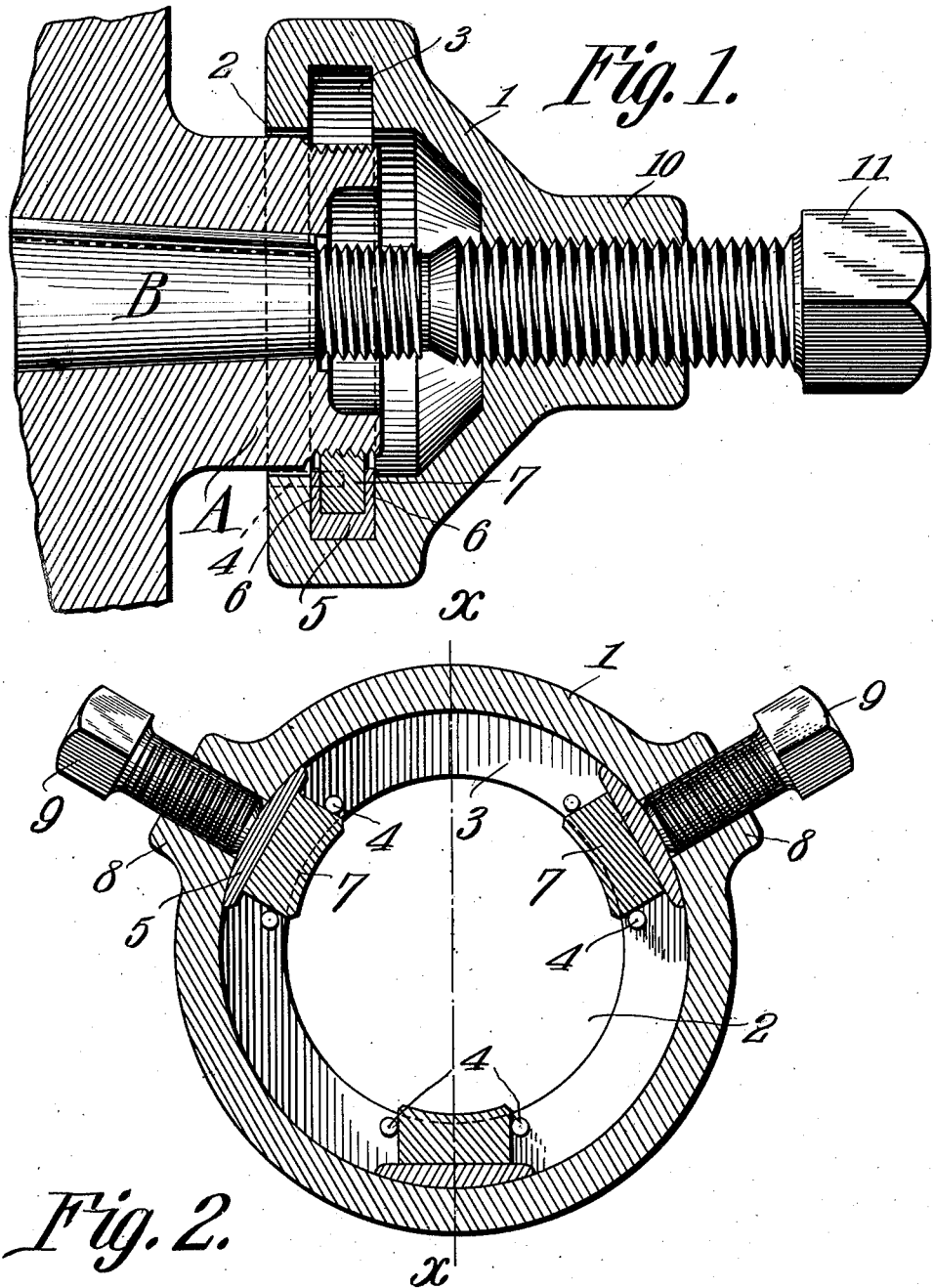
Valentine W. Straub
Inventor.

UNITED STATES PATENT OFFICE.

VALENTINE W. STRAUB, OF SAN JOSE, CALIFORNIA.

WHEEL-DETACHER.

984,978.  Specification of Letters Patent.  Patented Feb. 21, 1911.

Application filed April 29, 1910. Serial No. 558,337.

*To all whom it may concern:*

Be it known that I, VALENTINE W. STRAUB, a citizen of the United States, residing at San Jose, in the county of Santa Clara and State of California, have invented a new and useful Wheel-Detacher, of which the following is a specification.

This invention relates to tools for detaching wheels from their spindles and is more especially designed for automobile work.

One of the objects of the invention is to provide a device of the character which can be used upon wheel hubs of different sizes; will not injure the wheels upon which it is used; and which enables the wheels to be quickly drawn from their spindles.

Another object is to provide a device of simple and durable construction having clamping jaws which can be readily replaced when worn.

With these and other objects in view the invention consists of certain novel details of construction and combinations of parts hereinafter more fully described and pointed out in the claims.

In the accompanying drawings the preferred form of the invention has been shown.

In said drawings, Figure 1 is a central longitudinal section through the device in position on a wheel hub, said section being taken on the line *x—x*, Fig. 2. Fig. 2 is a transverse section through the device and looking in the direction of the open end thereof.

Referring to the figures by characters of reference, 1 designates a substantially conical casing having a recess 2 therein of sufficient area to receive the end of a wheel hub of considerable size. An interior annular groove 3 is formed in the wall of the recess 2 and dowel pins 4 or the like extend into this groove, said pins being preferably arranged in pairs about 120 degrees apart. Each pair of pins serves to retain within the groove 3, a shoe 5 having spaced flanges 6. A removable bearing block 7 of copper or other soft metal is arranged between the flanges of each shoe.

Interiorly screw threaded bosses 8 extend from the casing adjacent two of these shoes 5 and receive set screws 9. The remaining shoe may be held immovable by its dowel pins if so desired or can be fixedly connected to the casing in any other convenient manner.

A boss 10 extends from the apex of the casing and has a threaded opening for the reception of a forcing screw 11.

In using the device the casing is placed on the end of a hub A and the screws 9 are tightened so as to clamp the blocks 7 upon the hub. The screw 11 is then forced inwardly against the spindle B, thus causing the casing to pull the hub off of the spindle. Should the blocks 7 become worn new ones can be readily substituted.

Obviously various changes may be made in the construction and arrangement of the parts without departing from the spirit or sacrificing any of the advantages of the invention as defined in the appended claims.

What is claimed is:

1. A hub receiving member, spindle forcing means carried thereby, and adjustable hub gripping devices housed within said member.

2. A hub receiving member, spindle forcing means carried thereby, a non-adjustable hub gripping device housed in said member, and adjustable hub gripping devices housed in said member and coöperating with the non-adjustable member.

3. A casing having an interior annular groove, spindle forcing means engaging the casing, shoes mounted in the groove, and means for clamping the shoes upon a hub.

4. A casing having an interior annular groove, shoes loosely mounted in the groove and provided with wear blocks, means for clamping the shoes upon a hub, and a spindle forcing screw extending axially into the casing.

In testimony that I claim the foregoing as my own, I have hereto affixed my signature in the presence of two witnesses.

VALENTINE W. STRAUB.

Witnesses:
 A. B. HUNTER,
 WM. GUSSEFELD, Jr.